United States Patent
Kalgaonkar et al.

(10) Patent No.: US 12,540,271 B2
(45) Date of Patent: Feb. 3, 2026

(54) COMPOSITIONS FOR ENHANCING VISCOSITY OF SUBTERRANEAN FLUIDS UTILIZING CHELATING AGENTS

(71) Applicants: Saudi Arabian Oil Company, Dhahran (SA); King Fahd University of Petroleum & Minerals, Dhahran (SA)

(72) Inventors: Rajendra Arunkumar Kalgaonkar, Dhahran (SA); Amro Othman, Al Khobar (SA); Muhammed Shahzad Kamal, Dhahran (SA); Mohamed Mahmoud, Dhahran (SA); Murtada Saleh Aljawad, Dhahran (SA); Qasim Sahu, Muntazah (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 18/734,074

(22) Filed: Jun. 5, 2024

(65) Prior Publication Data
US 2025/0376618 A1  Dec. 11, 2025

(51) Int. Cl.
*C09K 8/68* (2006.01)
*C09K 8/88* (2006.01)

(52) U.S. Cl.
CPC .............. *C09K 8/685* (2013.01); *C09K 8/885* (2013.01); *C09K 2208/28* (2013.01)

(58) Field of Classification Search
CPC ..... C09K 8/685; C09K 8/885; C09K 2208/28
See application file for complete search history.

(56) References Cited

U.S. PATENT DOCUMENTS

| | | | |
|---|---|---|---|
| 8,408,301 | B2 | 4/2013 | Lord et al. |
| 9,745,509 | B2 | 8/2017 | Nasr-El-Din et al. |
| 10,995,257 | B2 | 5/2021 | De Wolf et al. |
| 11,466,200 | B2 | 10/2022 | Beuterbaugh et al. |
| 2013/0213657 | A1 | 8/2013 | Dobson, Jr. et al. |
| 2013/0303412 | A1* | 11/2013 | Luyster .......... C09K 8/86 507/236 |
| 2015/0141302 | A1 | 5/2015 | Nasr-El-Din et al. |

(Continued)

FOREIGN PATENT DOCUMENTS

EP  3101086 A1  12/2016

OTHER PUBLICATIONS

Almubarak, Tariq et al.; "Zirconium Crosslinkers: Understanding Performance Variations in Crosslinked Fracturing Fluids" OTC-30381-MS, Offshore Technology Conference Asia, Nov. 2-6, 2020; pp. 1-24.

(Continued)

*Primary Examiner* — Crystal J Lee
(74) *Attorney, Agent, or Firm* — Bracewell LLP; Constance G. Rhebergen; Eleanor T. Porter

(57) ABSTRACT

A composition for use in well stimulation operations, the composition comprising a saline fluid, the saline fluid comprising between 50,000 ppm and 70,000 ppm; a polymer, the polymer operable to react with a crosslinker to increase a viscosity of the saline fluid; a zirconium crosslinker, the zirconium crosslinker operable to react with the polymer; and a chelating agent, the chelating agent comprises L-glutamic acid N, N diacetic acid (GLDA), wherein the GLDA is present in an amount between 1 wt % and 8 w t %.

8 Claims, 2 Drawing Sheets

(56) References Cited

U.S. PATENT DOCUMENTS

| | | | |
|---|---|---|---|
| 2016/0376881 A1* | 12/2016 | Li | C09K 8/86 |
| | | | 507/217 |
| 2018/0258342 A1* | 9/2018 | Nguyen | C09K 8/887 |
| 2020/0140745 A1 | 5/2020 | Chopade et al. | |

OTHER PUBLICATIONS

Alohaly, Maryam et al.; "Seawater Fracturing Fluid Development Challenges: A Comparison Between Seawater-Based and Freshwater-Based Fracturing Fluids Using Two Types of Guar Gum Polymers" SPE-182799-MS, Annual Tech. Sym. & Exh. Apr. 25-28, 2016; pp. 1-16.

Economides, Michael J et al.; "Reservoir Stimulation" Third Edition, Wiley, Jun. 9, 2000; pp. 1-815.

Elsarawy, Ahmed et al.; "Compatibility and Rheology of High-pH Borate Gels Prepared with Produced Water for Hydraulic-Fracturing Applications" SPE 185953, 2017 SPE Production & Operations; pp. 1-17.

Harris, Phillip C. et al.; "A Comparison of Freshwater—and Seawater-Based Borate-Crosslinked Fracturing Fluids" SPE 50777, International Symposium on Oilfield Chemistry, Houston, TX, Feb. 16-19, 1999, pp. 1-5.

Hassan, Amjed et al.; "Applications of Chelating Agents in the Upstream Oil and Gas Industry: A Review" Energy & Fuels (2020) vol. 34, Issue 12; pp. 15593-15613.

Kamal, Muhammad Shahzad et al.; "Development of Chelating Agent-Based Polymeric Gel System for Hydraulic Fracturing" Energies 2018, 11; pp. 1-15.

Lepage, J.N .. N et al.; "An Environmentally Friendly Stimulation Fluid for High-Temperature Applications" SPE Journal vol. 16, Issue 1, Mar. 2011; pp. 1-5.

Majid, A.B. Abdul et al.; "Seawater Based Fracturing Fluid: A Game Changer in Hydraulic Fracturing Applications in Saudi Arabia" SPE-184015-MS, SPE Middle East Oil & Gas Show and Conference, Manama, Bahrain, Mar. 2017; pp. 1-15.

Othman, Amro et al.; "Chelating Agents Usage in Optimization of Fracturing Fluid Rheology Prepared from Seawater" Polymers 2021, 13, 2111; pp. 1-15.

Othman, Amro et al.; "Rheological Study of Seawater-Based Fracturing Fluid Containing Polymer, Crosslinker, and Chelating Agent" ACS Omega 2022, 7; pp. 31318-31326.

Szopinski, Daniel et al.; "Structure-property relationships of carboxymethyl hydroxypropyl guar gum in water and a hyperentanglement parameter" (abstract only) Carbohydrate Polymers, vol. 119, Mar. 30, 2015; pp. 159-166.

Wilson, Adam; "A Comparison Between Seawater-Based and Freshwater-Based Fracturing Fluids" SPE-0317-0046-JPT, Journal of Petroleum Technology, vol. 69, Issue 3, Mar. 2017; pp. 1-5.

\* cited by examiner

COMPOSITIONS FOR ENHANCING VISCOSITY OF SUBTERRANEAN FLUIDS UTILIZING CHELATING AGENTS

TECHNICAL FIELD

Disclosed are compositions and methods for hydraulic fracturing treatments. Specifically, disclosed are compositions and methods for viscosified hydraulic fracturing treatments in high salinity waters.

BACKGROUND

Saline water, such as seawater (SW) and produced water (PW), have recently become a preferred alternative to freshwater in hydraulic fracturing operations. This interest in alternative water resources is mainly due to the high price and limited supply of freshwater, as well as the challenges posed by delivering it to offshore areas. While an abundance of seawater eliminates concerns about price, accessibility, and availability, it may introduce new difficulties such as formation damage, instability, and low viscosities caused by associated ions. Many additives trap the ions and enhance the rheology, alleviating the seawater problems. The gelling agent (polymer) hydrates more slowly in seawater, with a different crosslinking mechanism. That is why the crosslinker affects saline water more than freshwater. The main issue with seawater is that it contains ions (like sulfate) that might harm the formation and alter the rheology of the fracturing fluid. The SW rheology is impacted owing to the presence of divalent ions, such as calcium ions ($Ca^{2+}$) and magnesium ions ($Mg^{2+}$), and monovalent ions, such as sodium ions ($Na^+$) and potassium ions ($K^+$), causing a decrease in viscosity. The principal source of precipitation and viscosity reduction is the divalent ions, yet, monovalent ions diminish the viscosity when no divalent ions are present. Higher viscosities can be achieved at low ion total dissolved solids (TDS). The seawater composition and salinity vary in different regions; nonetheless, the disclosed composition may be used in other seawater formulations with minor adjustments.

SUMMARY

Disclosed are compositions and methods for hydraulic fracturing treatments. Specifically, disclosed are compositions and methods for viscosified hydraulic fracturing treatments in high salinity waters.

In a first aspect, a composition for use in well stimulation operations is provided. The composition includes a saline fluid, the saline fluid includes between 50,000 ppm and 70,000 ppm, a polymer, the polymer operable to react with a crosslinker to increase a viscosity of the saline fluid, a zirconium crosslinker, the zirconium crosslinker operable to react with the polymer, and a chelating agent, the chelating agent includes L-glutamic acid N, N diacetic acid (GLDA), where the GLDA is present in an amount between 1 weight percent (wt %) and 8 wt %.

In certain aspects, the saline fluid can be selected from the group consisting of seawater, produced water, and combinations of the same. In certain aspects, the polymer includes carboxymethyl hydroxypropyl guar (CMHPG) polymer. In certain aspects, the polymer is present in an amount between 0.5 wt % and 0.6 wt %. In certain aspects, the zirconium crosslinker is present in an amount of 1 wt %. In certain aspects, the chelating agent is present in an amount between 1 wt % and 8 wt %. In certain aspects, the composition has a viscosity in the range between 50 centiPoise (cP) and 1000 cP. In certain aspects, the composition has a viscosity in the range between 90 cP and 1000 cP after 4 hours.

In a second aspect, a method of using a hydraulic fracturing fluid is provided. The method includes the steps of injecting the hydraulic fracturing fluid into a formation during a well stimulation operation, where the hydraulic fracturing fluid includes a saline fluid, the saline fluid includes between 50,000 ppm and 70,000 ppm, a polymer, the polymer operable to react with a crosslinker to increase a viscosity of the saline fluid, a zirconium crosslinker, the zirconium crosslinker operable to react with the polymer, and a chelating agent, the chelating agent includes L-glutamic acid N, N diacetic acid (GLDA), where the GLDA is present in an amount between 1 wt % and 8 wt %, and where the hydraulic fracturing fluid has a viscosity between 1 cP and 30 cP before reaching the formation and a viscosity of between 30 cP and 50 cP after reaching the formation.

In certain aspects, the well stimulation operation is selected from the group consisting of fracturing and proppant transport.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
FIG. 1 is a picture from the example of a sample in the absence of chelating agent.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The composition and methods delay increase in viscosity in high salinity waters in fracturing fluid treatments. Advantageously, the compositions alleviate the necessity for using freshwater or low salinity waters in hydraulic fracturing treatments.

As used throughout, "high salinity" means a fluid having a total dissolved solids greater than 50,000 ppm.

As used throughout, "stable" means the viscosity maintains its value under shear stress, can transport proppant and can hold the transported proppant to avoid screen out.

The hydraulic fracturing fluid includes a saline fluid, a polymer, a zirconium crosslinker, and a chelating agent.

The saline fluid be any high salinity water. The saline fluid can include seawater, produced water, and combinations of the same. The saline fluid can have a total dissolved solids of 50,000 ppm, alternately between 50,000 ppm and 70.00 ppm, and alternately 67,700 ppm.

The polymer acts as a gelling agent reacting with the crosslinker to create a gel that increases the viscosity of the saline fluid. The polymer can be a carboxymethyl hydroxypropyl guar (CMHPG) polymer. The CMHPG polymer can be present in amount between 0.5 wt % and 0.6 wt % and alternately in an amount of 0.6 wt %. Amounts greater than 0.6 wt % can cause formation damage. The amount of CMHPG can be controlled by field application standards not to exceed 50 pounds per thousand gallons (pptg) (5.99 kg/m$^3$). Advantageously, CMHPG has compatibility with high and low-pH environments, such that regardless of the pH it has better hydration and slow degradation.

The zirconium crosslinker reacts with the polymer to create a gel that increases the viscosity of the saline fluid. Zirconium (Zr) has four electrons in the outer valence and exists in an ionic state ($Zr^{4+}$). The ionic state of zirconium can be used to keep zirconium from precipitating and to keep zirconium nanoparticle growth to a minimum. The zirconium containing crosslinker can be present in an amount of 1 wt %. At concentrations less than 1 wt % the desired viscosity of the hydraulic fracturing fluid cannot be achieved.

Chelating agents can delay the viscosification due to the crosslinking of the polymer and zirconium crosslinker. Advantageously, the chelating agent can capture ions and soften the saline water, while reducing scale formation. The chelating agent can be L-glutamic acid N, N diacetic acid (GLDA). The GLDA can be selected from a high pH GLDA, a low pH GLDA, and combinations of the same. The high pH GLDA can have a pH in the range of 11 to 13.7 and a chemical structure according to formula (I):

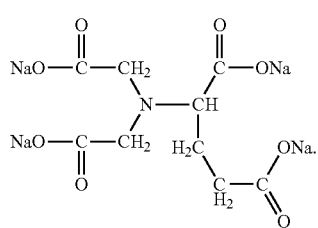

The low pH GLDA can have a pH in the range of 3.4 to 4 and have a chemical structure of formula (II):

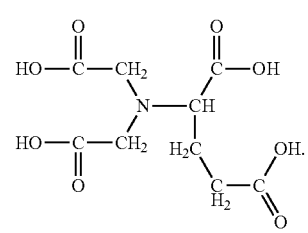

Chelating agents can be used to lower the hardness of saline water to reduce damage on the formation. Chelating agents can boost the thickening effect, but too much chelating agent can have the opposite effect. The chelating agent can increase the pH of the hydraulic fracturing fluid thus delaying viscosification. Alternately, the pH of the chelating agent can be modified with sodium hydroxide to achieve the desired pH prior to addition to the hydraulic fracturing fluid. The chelating agent can be present in an amount between 1 wt % and 8 wt %, alternately between 1 wt % and 5 wt %, and alternately between 1.5 wt % and 4 wt %. At amounts between 1 wt % and 8 wt % of the chelating agent, the viscosity of the chelating agent can have a viscosity of around 1000 cP for the first half hour which is considered high viscosity. At amounts greater than 8 wt %, the chelating reduces the ability of the crosslinker to crosslinker the CMHPG polymer. Advantageously, the GLDA softens the saline water and captures the ions preventing salt precipitation. Advantageously, GLDA can provide scale inhibition resulting in the need for fewer additives. Advantageously, GLDA can withstand formation temperatures up to 300° F. (148.9° C.) without degrading or changing its properties, while reducing the interfacial tension of the hydraulic fracturing fluid.

In at least one embodiment, the hydraulic fracturing fluid includes seawater, CMHPG polymer, a zirconium crosslinker, and a high pH GLDA chelating agent. In at least one embodiment, the hydraulic fracturing fluid includes seawater, CMHPG polymer, a zirconium crosslinker, a low pH GLDA chelating agent, and sodium hydroxide. The results show that fluids can be formulated using sea water, CMHPG polymer, zirconium crosslinker, and GLDA chelating agents and achieve stable viscosity over time.

The hydraulic fracturing fluids can achieve viscosity between 50 and 1000 cP, alternately between 90 cP and 1000 cP after 1 hour. The hydraulic fracturing fluids can maintain a stable viscosity between 50 cP and 1000 cP and alternately between 90 cP and 1000 cP for at least 3 hours, and alternately between 0.5 and 4 hours. The minimum viscosity necessary to carry a proppant is 300 cP at a shear rate of 100 1/s.

The hydraulic fracturing fluid can have a pH of 10 and alternately between 10 and 14. At pH greater than 10 the zirconium crosslinker can be activated.

The hydraulic fracturing fluid can be used for well stimulation operations, including fracturing and proppant transport. The hydraulic fracturing fluid can include a proppant. Any proppant suitable for use in a hydraulic fracturing fluid can be used.

Advantageously, the hydraulic fracturing fluid prevents or reduces formation damage by preventing scales and precipitated ions. In preparing the hydraulic fracturing fluid the zirconium crosslinker is added last in the order of mixing. The function of the zirconium crosslinker is to link between the polymer chains, if the zirconium crosslinker is added before the polymer and the chelating agent is available, the chelating agent will adversely interact with the zirconium crosslinker disrupting the ability to viscosify.

The hydraulic fracturing fluid is in the absence of ethylenediaminetetraacetic acid (EDTA), diethylenetriaminepentaacetic acid (DTPA), polyvinyl alcohol. The hydraulic fracturing fluids are in the absence of emulsions. The hydraulic fracturing fluid is in the absence of an emulsion. The hydraulic fracturing fluid is in the absence of a foam.

EXAMPLE

Experiments to produce hydraulic fracturing fluid compositions were performed. The experiments were conducted using seawater with a CMHPG polymer, a GLDA chelating agent, and a zirconium crosslinker. The composition of the seawater is shown in Table 1 in grams per liter.

TABLE 1

Individual salts and total salts in seawater.

| Components | Concentration (g/l) |
|---|---|
| NaHCO$_3$ | 0.165 |
| Na$_2$SO$_4$ | 6.339 |
| NaCl | 41.172 |
| CaCl$_2$•2H$_2$O | 2.387 |
| MgCl$_2$•6H$_2$O | 17.644 |
| Total Dissolved Solids | 67.707 |

The CMHPG polymer was XLFC-3B obtained from Baker Hughes Inc. Houston, TX. The chelating agent was a high pH Dissolvine® StimWell DGH GLDA of 40% active content obtained from Nouryon, Houston, TX. The high pH GLDA had a pH of 13.7, but when used at 1 w/v % the pH is in the range of 11-11.8. The zirconium crosslinker was obtained from Taqa Company.

Experimental Design

All tests were conducted in a high-pressure, high-temperature (HPHT) Anton Paar-MCR 302 rheometer at a constant pressure of 500 psi (3447.4 kPa) and a shear rate of 100 l/s. The temperature varied based on the experiment. The CMHPG polymer, at a concentration of 0.6 wt %, was hydrated in seawater for at least 40 minutes in each experiment for each fluid. The chelating agent was added to the hydrated polymer and mixed for 5 minutes. Then 1 wt % zirconium crosslinker was added and the fluid was mixed for 5 minutes and then added to the rheometer. In the first experiment, the temperature was held constant at 120° C. and four different concentrations of chelating agent were used: 0 wt %, 1.6 wt %, 4 wt %, and 8 wt %. In the second experiment, the same four concentrations of chelating agents were used, but the temperature was ramped at a rate of 1° C./minute from 25° C. to 120° C.

Results and Discussion

Experiment #1—Constant Temperature

Mixtures were prepared according to the experimental designed described with 0 wt %, 1.6 wt %, 4 wt %, and 8 wt % high pH GLDA at constant temperature of 120° C. For the sample in the absence of chelating agent, when the 1 wt % zirconium crosslinker was added to the hydrated CMHPG polymer in seawater it instantly crosslinked before heating in the rheometer, as can be seen in FIG. 1. When the temperature reached 120° C., the seawater-based fluid lost its integrity and the viscosity decreased as can be seen in FIG. 2.

Figure 2:
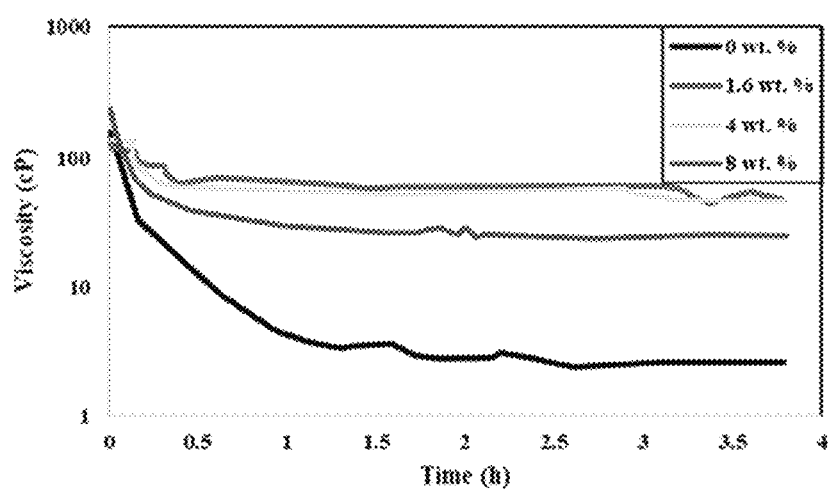
FIG. 2 is a graph depicting viscosity over time for mixtures of 0.6 wt. % CMHPG polymer, 1 wt. % zirconium crosslinker in seawater-based fluid and GLDA concentrations at 120° C., 100 l/s, and 500 psi (3447.4 kPa).

The results of the rheology tests are shown in FIG. 2, viscosity versus time. Increasing the concentration of the chelating agent results in higher initial viscosity value and the viscosity valves increased during all shearing times in the presence of the GLDA chelating agents compared to the fluids in the absence of GLDA. While all GLDA concentrations gave stable viscosity values, the 1.6 wt % and 4 wt % concentrations resulted in higher viscosities than the 8 wt % concentration. The GLDA did not interfere with the crosslinking process as it chelates the divalent cations in seawater, such as calcium ions. The addition of GLDA to seawater-based fracturing fluids enhanced the viscosity of the fluid.

Experiment #2—Ramped Temperature

Figure 3:
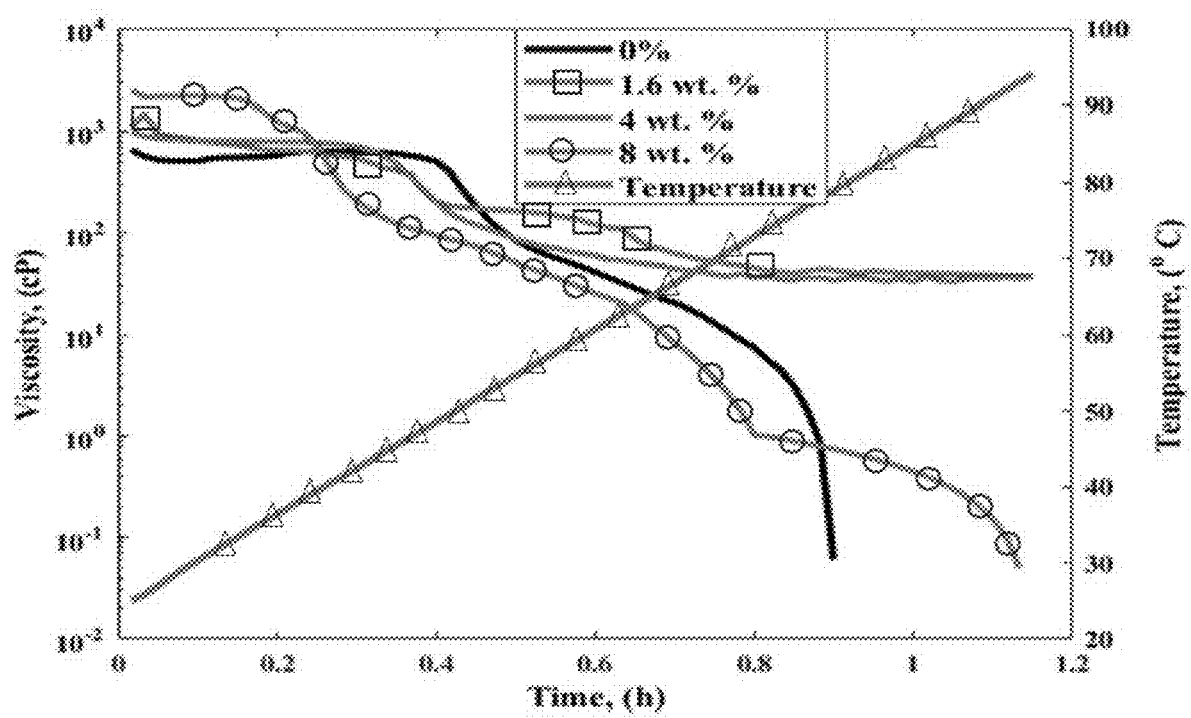
FIG. 3 is a graph depicting viscosity over time for mixtures of 0.6 wt. % CMHPG polymer, 1 wt. % zirconium crosslinker in seawater-based fluid and GLDA concentrations at ramped temperature from 25° C. to 120° C., 100 l/s and 500 psi (3447.4 kPa).

Mixtures were prepared according to the experimental designed described with 0 wt %, 1.6 wt %, 4 wt %, and 8 wt % high pH GLDA at temperature ramped by 1° C./min from 25° C. to 120° C. The results of the rheology tests are shown in FIG. 3, viscosity versus time. FIG. 3 shows that all viscosities of seawater-based fluids started with viscosities around 1,000 cP and crosslinked instantly, either with or without the chelating agent. In addition, the results show that lower GLDA concentrations lead to more stable and greater viscosity values compared to seawater-based fluids in the absence of GLDA or at concentration of GLDA of 8 wt %.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

What is claimed is:

1. A composition for use in well stimulation operations, the composition comprising:
   a saline fluid, the saline fluid comprising between 50,000 ppm and 70,000 ppm;
   a polymer, the polymer operable to react with a crosslinker to increase a viscosity of the saline fluid, wherein the polymer is present in an amount between 0.5 wt % and 0.6 wt %;
   a zirconium crosslinker, the zirconium crosslinker operable to react with the polymer, wherein the zirconium crosslinker is present in an amount of 1 wt %; and
   a chelating agent, the chelating agent comprises L-glutamic acid N, N diacetic acid (GLDA), wherein the GLDA is present in an amount between 1 wt % and 8 wt %,
      wherein the composition has a viscosity in the range between 90 cP and 1000 cP after 4 hours,
      wherein the composition has a pH between 10 and 14 where pH greater than 10 activates the zirconium crosslinker.

2. The composition of claim 1, wherein the saline fluid can be selected from the group consisting of seawater, produced water, and combinations of the same.

3. The composition of claim 1, wherein the polymer comprises carboxymethyl hydroxypropyl guar (CMHPG) polymer.

4. The composition of claim 1, wherein the composition has a viscosity in the range between 90 cP and 1000 cP.

5. A method of using a hydraulic fracturing fluid, the method comprising the step of:
   injecting the hydraulic fracturing fluid into a formation during a well stimulation operation, wherein the hydraulic fracturing fluid comprises:
   a saline fluid, the saline fluid comprising between 50,000 ppm and 70,000 ppm;
   a polymer, the polymer operable to react with a crosslinker to increase a viscosity of the saline fluid, wherein the polymer is present in an amount between 0.5 wt % and 0.6 wt %;
   a zirconium crosslinker, the zirconium crosslinker operable to react with the polymer wherein the zirconium crosslinker is present in an amount of 1 wt %; and
   a chelating agent, the chelating agent comprises L-glutamic acid N, N diacetic acid (GLDA), wherein the GLDA is present in an amount between 1 wt % and 8 wt %; and
   wherein the hydraulic fracturing fluid has a viscosity of 1000 cP before reaching the formation and a viscosity of between 90 cP and 100 cP after 1 hour, wherein the hydraulic fracturing fluid has a pH between 10 and 14, where pH greater than 10 activates the zirconium crosslinker.

6. The method of claim 5, wherein the well stimulation operation is selected from the group consisting of fracturing and proppant transport.

7. The method of claim 5, wherein the saline fluid can be selected from the group consisting of seawater, produced water, and combinations of the same.

8. The method of claim 5, wherein the polymer comprises carboxymethyl hydroxypropyl guar (CMHPG) polymer.

* * * * *